United States Patent
Ure

(10) Patent No.: US 7,382,871 B1
(45) Date of Patent: Jun. 3, 2008

(54) CALL SETUP USING A PACKET-SWITCHED ADDRESS SUCH AS AN INTERNET ADDRESS OR THE LIKE

(75) Inventor: Michael J. Ure, Cupertino, CA (US)

(73) Assignee: Samhain Union LLC, Wilmington, DE (US)

(*) Notice: Subject to any disclaimer, the term of this patent is extended or adjusted under 35 U.S.C. 154(b) by 0 days.

(21) Appl. No.: 09/332,545

(22) Filed: Jun. 14, 1999

(51) Int. Cl.
H04M 3/42 (2006.01)

(52) U.S. Cl. .............................. 379/218.01; 379/201.05
(58) Field of Classification Search .......... 379/356.01, 379/201.01–201.05, 218.01, 218.02, 353–355.07; 370/352
See application file for complete search history.

(56) References Cited

U.S. PATENT DOCUMENTS

| | | | |
|---|---|---|---|
| 5,239,677 A | | 8/1993 | Bates |
| 5,315,705 A | * | 5/1994 | Iwami et al. ................ 709/245 |
| 5,483,586 A | * | 1/1996 | Sussman ................ 379/218.01 |
| 5,689,547 A | | 11/1997 | Molne |
| 5,778,054 A | * | 7/1998 | Kimura et al. ........... 379/93.23 |
| 5,802,510 A | * | 9/1998 | Jones ............................. 707/2 |
| 5,850,433 A | * | 12/1998 | Rondeau ................ 379/218.01 |
| 5,917,904 A | * | 6/1999 | Theis .................... 379/355.08 |
| 5,923,736 A | * | 7/1999 | Shachar .................... 379/93.17 |
| 5,940,834 A | * | 8/1999 | Pinard et al. ................ 707/102 |

(Continued)

OTHER PUBLICATIONS

"The Internet Telephony Red Herring," HP Laboratories Technical Report n 96-98 Jun. 1996. pp. 1-15.

Primary Examiner—Harry S. Hong
(74) Attorney, Agent, or Firm—Connolly Bove Lodge & Hutz LLP; Myron Keith Wyche

(57) ABSTRACT

The present invention, generally speaking, provides a method and apparatus for setting up a telephone connection using an email address or the like. In many cases, an email address or other Internet address such as a URL may be easily remembered or, in the case of a company, for example, may often be correctly guessed, whether the company is local, out-of-state, or in another country. Telephone numbers, on the other hand, are remembered only with considerable difficulty, and can be guessed correctly only through clairvoyance. (In fact, memory experts that have astounded audiences by memorizing large portions of the local telephone directory have done so by converting the numbers to words or phrases using a set of rules.) In accordance with one aspect of the invention, a character string is entered into an electronic system such as a personal computer, a deskset smartphone, or a cellular smartphone. A determination is made as to whether or not the character string is a telephone number. If so, a desired telecommunications connection is established directly using the phone number. If not, a preliminary telecommunications connection is established using the character string. The preliminary telecommunications connection may be to a mail server or a Web server, for example. During the course of the preliminary telecommunications connection, a telephone number is received. Preferably, the first thing the user receives back is what the users wants—a phone number—without any intermediate interaction. The telephone number is then used to establish the desired telecommunications connection. Telephone numbers are preferably "self-listed," i.e., stored in accordance with a naming convention on the email or other server. The method may be entirely automated to achieve in effect an Internet-based, world-wide, distributed telephone directory. The entities listed in the directory may themselves determine listing content and access policies.

20 Claims, 15 Drawing Sheets

U.S. PATENT DOCUMENTS

| | | | |
|---|---|---|---|
| 6,091,808 A * | 7/2000 | Wood et al. | 379/201.04 |
| 6,104,789 A * | 8/2000 | Lund | 379/93.23 |
| 6,215,784 B1 * | 4/2001 | Petras et al. | 370/356 |
| 6,377,570 B1 * | 4/2002 | Vaziri et al. | 370/352 |
| 6,381,324 B1 * | 4/2002 | Shaffer et al. | 379/207.12 |
| 7,133,846 B1 * | 11/2006 | Ginter et al. | 705/54 |
| 2004/0034700 A1 * | 2/2004 | Polcyn | 709/223 |

* cited by examiner e-dial, Inc.
10518 Phil Place
Cupertino, CA 95014
(408) 255-4800
(800) 337-6640

| DEPARMENT | PHONE | FAX |
|---|---|---|
| Accounting | (408) 255-4815 | (408) 255-4892 |
| Corporate | (xxx) xxx-xxxx | (xxx) xxx-xxxx |
| Engineering | (xxx) xxx-xxxx | (xxx) xxx-xxxx |
| Human Resources | (xxx) xxx-xxxx | (xxx) xxx-xxxx |
| Legal | (xxx) xxx-xxxx | (xxx) xxx-xxxx |
| Sales/Marketing | (xxx) xxx-xxxx | (xxx) xxx-xxxx |
| Technical Assistance | (xxx) xxx-xxxx | (xxx) xxx-xxxx |

Figure 7 e-dial, Inc.
10518 Phil Place
Cupertino, CA 95014
(408) 255-4800
(800) 337-6640

SALES/MARKETING DEPARMENT

| OFFICE | PHONE | FAX |
|---|---|---|
| Pacific | (408) 255-4815 | (408) 255-4892 |
| Midwest | (xxx) xxx-xxxx | (xxx) xxx-xxxx |
| Northeast | (xxx) xxx-xxxx | (xxx) xxx-xxxx |
| European | (xxx) xxx-xxxx | (xxx) xxx-xxxx |
| International | (xxx) xxx-xxxx | (xxx) xxx-xxxx |

Figure 8 e-dial, Inc.
10518 Phil Place
Cupertino, CA 95014
(408) 255-4800
(800) 337-6640

PACIFIC SALES/MARKETING

| NAME | PHONE | FAX | E-MAIL | CELL | PAGER |
|---|---|---|---|---|---|
| Horne, Glen | (408) 255-4815 | (408) 255-4892 | g.horne@edial.com | (408) 290-2906 | (800) 408-6195 |
| xxxxx, xxxx | (xxx) xxx-xxxx | (xxx) xxx-xxxx | (xxx) xxx-xxxx | (xxx) xxx-xxxx | (xxx) xxx-xxxx |
| xxxxx, xxxx | (xxx) xxx-xxxx | (xxx) xxx-xxxx | (xxx) xxx-xxxx | (xxx) xxx-xxxx | (xxx) xxx-xxxx |
| xxxxx, xxxx | (xxx) xxx-xxxx | (xxx) xxx-xxxx | (xxx) xxx-xxxx | (xxx) xxx-xxxx | (xxx) xxx-xxxx |
| xxxxx, xxxx | (xxx) xxx-xxxx | (xxx) xxx-xxxx | (xxx) xxx-xxxx | (xxx) xxx-xxxx | (xxx) xxx-xxxx |

CALL SETUP USING A PACKET-SWITCHED ADDRESS SUCH AS AN INTERNET ADDRESS OR THE LIKE

This application claims priority under 35 USC 120 of PCT/US98/01419 filed Jan. 26, 1998, designating the U.S., which is incorporated herein by reference, which in turns claims priority of U.S. Provisional Application 60/036,047 filed Jan. 27, 1997.

BACKGROUND OF THE INVENTION

The present invention relates to telephone and computer communications.

STATE OF THE ART

With the advent of multimedia computers, considerable activity has occurred in computer telephony. In computer telephony, computer capabilities are used to make telephone communications easier. Different products have achieved different levels of integration between computer and telephone.

In one product category, personal computers, incremental progress continues to be made toward the integration of telephony functions. The most noticeable development has been the advent of the Internet phone, i.e., software for carrying out full-duplex voice communications across the Internet.

In a second product category, smart deskset telephones, various products have begun to emerge, including smart phones from such companies as Philips and Intelliphone.

In a third product category, smart cellular phones, smart cellular phones integrating voice and data communications have begun to become available from such companies as AT&T, Mitsubishi, and Nokia. The PocketNet™ phone from AT&T provides for Internet access using HDML, or Hyper-Device Markup Language. HDML, developed by Unwired Planet Inc. of Redwood City, Calif., acts as an intermediary between small devices such as cellular telephones and the Internet at large. The PocketNet phone is software-upgradeable.

A perspective view of the PocketNet phone is shown in FIG. 1. The phone may be placed in either a PHONE mode or a NET mode. FIG. 2 is a partial perspective view of the phone in PHONE mode. The phone is provided with a display 201 and a keypad 203. Keys within a first row 205 of the keypad are "softkeys," i.e., keys whose function varies according to operation of the phone and whose function is displayed in a display area above the key. Cursor keys and navigation keys 207 (HOME, CLR, BACK and HELP) are provided in the following two rows. In a further row 209 are provided device control keys (SEND, POWER and END).

The keypad has different modes—alpha, numeric and symbol—that are coordinated with the operational mode of the phone. In some circumstances, the keypad may be switched between modes, for example by pressing a center one of the soft keys. In PHONE mode, the keypad is automatically placed in (and cannot be changed from) numeric mode. FIG. 3 shows the phone following entry of a telephone number 301. The number is called by pressing the SEND key 303. The call is discontinued by pressing the END key 305.

The phone of FIG. 1 provides a directory in which names and numbers may be stored. The number may be a telephone number or an IP address. A telephone number may be automatically dialed by retrieving a directory entry and pressing SEND. However, if no number has been stored in the entered directory location, or if the location contains data other than a phone number (such as an IP address), then no call will be made, and an advisory message will appear in the display.

None of the foregoing products has yet achieved significant market penetration. Computers and telephones therefore, although merging, remain largely separate.

The adoption of email, on the other hand, has occurred at a much more rapid pace. Of routine computer users, most now have or soon will have an email address. Many have more than one email address, e.g, one for work and another for home. Email offers unparalleled convenience of written communication. The convenience of email does not, however, eliminate the need or desire for other modes of communication, including voice, fax and pager communications.

U.S. Pat. No. 5,239,577 to Bates et al., incorporated herein by reference, relates to a telecommunications network architecture and connection routing method for establishing cross-media (e.g., phone, cellular phone, fax, email) and cross-context (e.g, residence, business) connections. The proposed system and method, however, are unduly complex, both from the standpoint of required infrastructure and user interaction. A linking database, or "directory of directories," is maintained that includes one entry per subscriber, each of whom is identified by a unique personal identification number. The entry contains a table of pointers for various media/context combinations. The pointers point to various databases in which corresponding "addresses" (character strings to be used in establishing connections of various types) may be found. By providing the unique personal identification number of the person desired, a pointer to a database containing the desired address may be obtained, which database may then be queried in order to obtain the address itself.

However, as a preliminary matter, a database lookup must first be performed to obtain the unique personal identification number. This lookup is performed using a Line Identification Database (LDB) that provides a mapping between phone numbers and subscribers (identified by personal identification number) to which the phone numbers are assigned. The sequence of operations is therefore as follows: look up in the LDB, by telephone number, the unique personal identification number of the desired party; look up in the linking database, by personal identification number, a pointer to a database containing an address in the desired context; and finally look up the address in the desired context.

In addition to being unduly complex, the foregoing system is "person-centric." It does not make provision for discovering business addresses where the desired person is not known.

What is needed, therefore, is a way to achieve the convenience of email in others forms of telephonic communication.

SUMMARY OF THE INVENTION

The present invention, generally speaking, provides a method and apparatus for setting up a telephone connection using an email address or the like. In many cases, an email address or other Internet address such as a URL may be easily remembered or, in the case of a company, for example, may often be correctly guessed, whether the company is local, out-of-state, or in another country. Telephone numbers, on the other hand, are remembered only with considerable difficulty, and can be guessed correctly only through clairvoyance. (In fact, memory experts that have astounded audiences by memorizing large portions of the local telephone directory have done so by converting the numbers to words or phrases using a set of rules.) In accordance with one aspect of the invention, a character string is entered into an electronic system such as a personal computer, a deskset smartphone, or a cellular smartphone. A determination is made as to whether or not the character string is a telephone number. If so, a desired telecommunications connection is established directly using the phone number. If not, a preliminary telecommunications connection is established using the character string. The preliminary telecommunications connection may be to a mail server or a Web server, for example. During the course of the preliminary telecommunications connection, a telephone number is received. Preferably, the first thing the user receives back is what the users wants—a phone number— without any intermediate interaction. The telephone number is then used to establish the desired telecommunications connection. Telephone numbers are preferably "self-listed," i.e., stored in accordance with a naming convention on the email or other server. The method may be entirely automated to achieve in effect an Internet-based, world-wide, distributed telephone directory. The entities listed in the directory may themselves determine listing content and access policies.

BRIEF DESCRIPTION OF THE DRAWING

The present invention may be further understood from the following description in conjunction with the appended drawing. In the drawing:

FIG. 7 is a first screen display displayed in response to the entry of the URL;

FIG. 8 is a screen display displayed subsequent to the screen display of FIG. 7;

FIG. 9 is a screen display displayed subsequent to the screen display of FIG. 8;

FIG. 13 is a flow chart of processing steps for establishing a circuit-switched connection using an email address or the like;

FIG. 14 is a flow chart of processing steps for establishing a circuit-switched connection using a URL or the like.

DETAILED DESCRIPTION OF THE PREFERRED EMBODIMENTS

Figure 1:
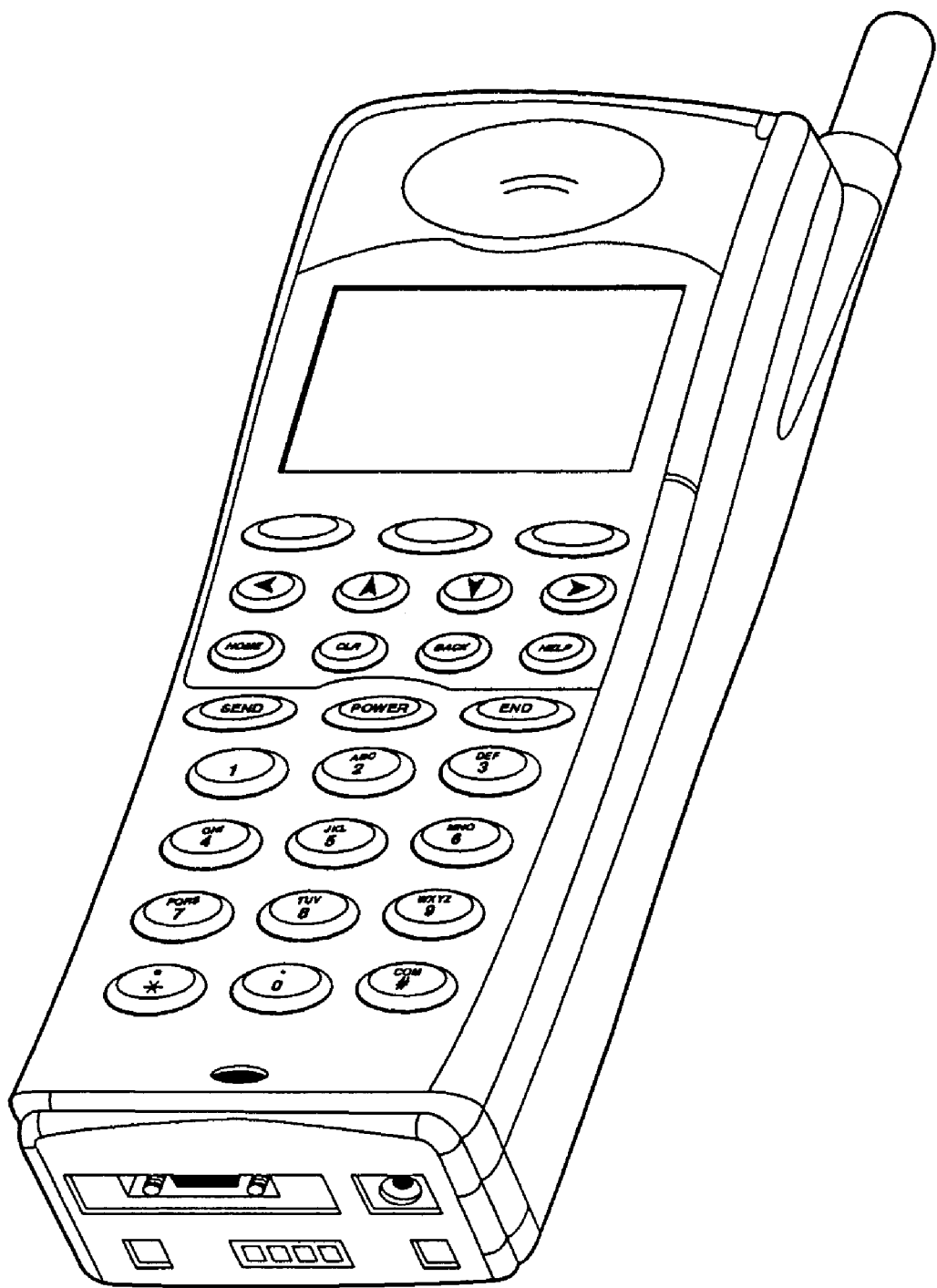
FIG. 1 is a perspective view of a known cellular telephone.
Figure 2:
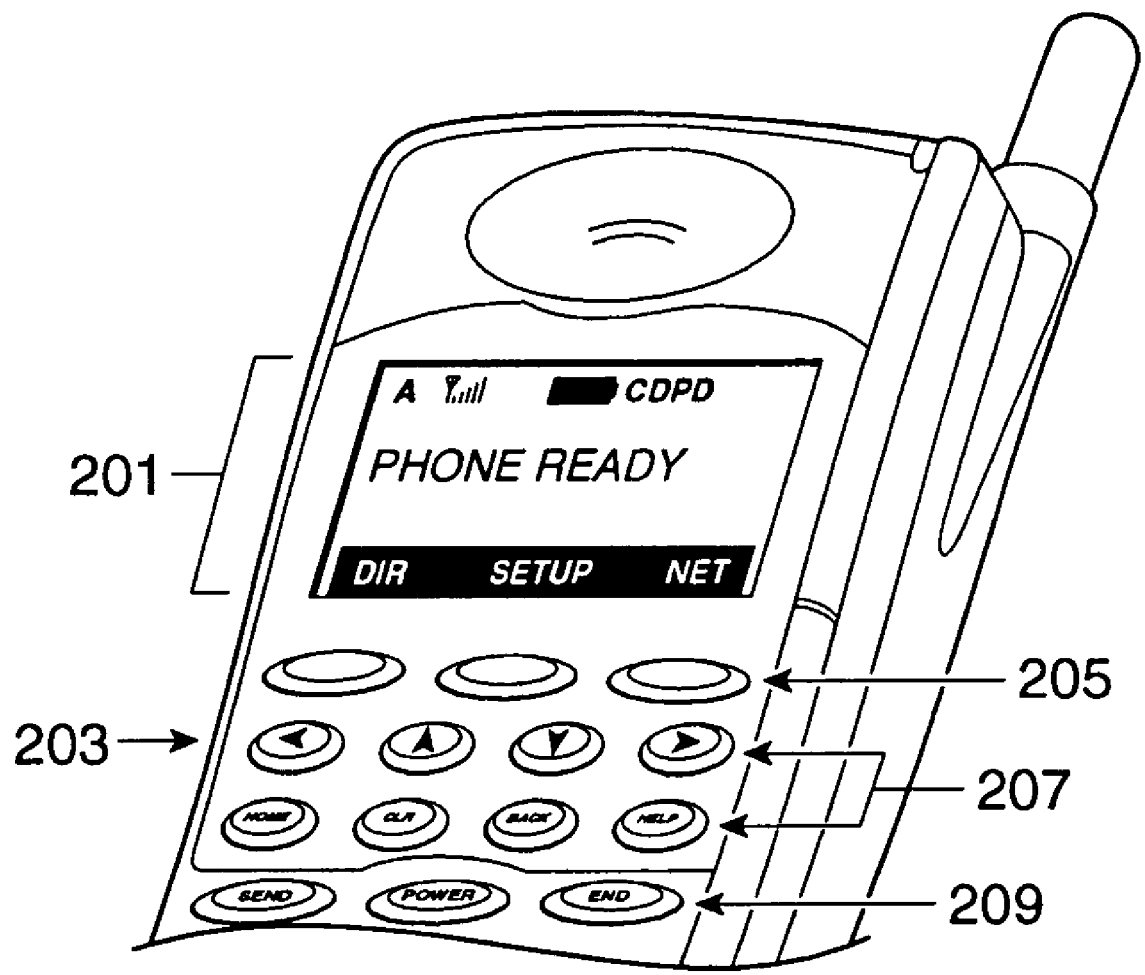
FIG. 2 is a partial perspective view of the cellular telephone of FIG. 1 with PHONE mode selected.
Figure 4:
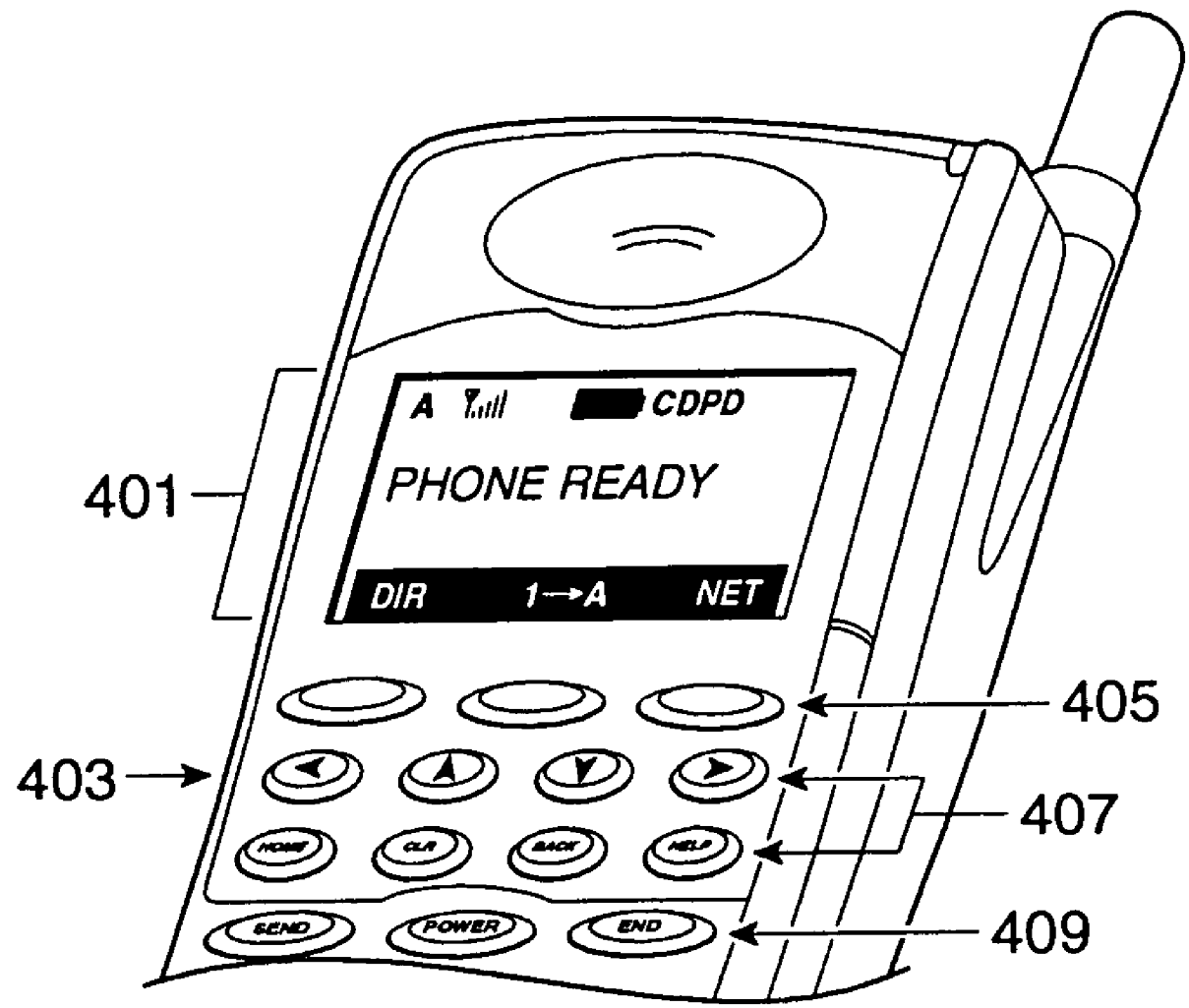
FIG. 4 is a partial perspective view of a modified cellular telephone with PHONE mode selected.

One possible embodiment of the present invention is a cellular phone like the cellular phone of FIG. 1. Referring to FIG. 4, a perspective view is shown of a cellular phone 400 modified in accordance with the teachings of the present invention. The cellular phone is in the PHONE mode and is ready to accept a phone number or, as described herein, another identifier. The cellular phone 400 has a display 401, and a keypad 403 including row 405, row 407 and row 409.

An object of the present invention is to allow an email address, URL or other identifier to be freely substituted for a phone number, a fax number, a pager number, etc., while requiring minimal if any additional steps on the part of a user. In some instances, hardware limitations may require additional steps. In the case of the cellular phone of FIG. 1 and the modified cellular phone of FIG. 4, for example, keypad limitations may require additional steps. In particular, where keypad modes are used to enable a common set of keys to perform diverse functions, a keypad mode selection step may be required on the part of the user, in addition to the steps the user would normally perform. Using an alternative input device, this limitation may be avoided. One such input device, for example, is described in PCT Application PCT/US96/18517 entitled TOUCH-SENSITIVE INPUT DEVICE, METHOD AND SYSTEM THAT MINIMIZES THE NEED FOR MEMORIZATION, filed Nov. 18, 1996 and incorporated herein by reference.

Figure 5:
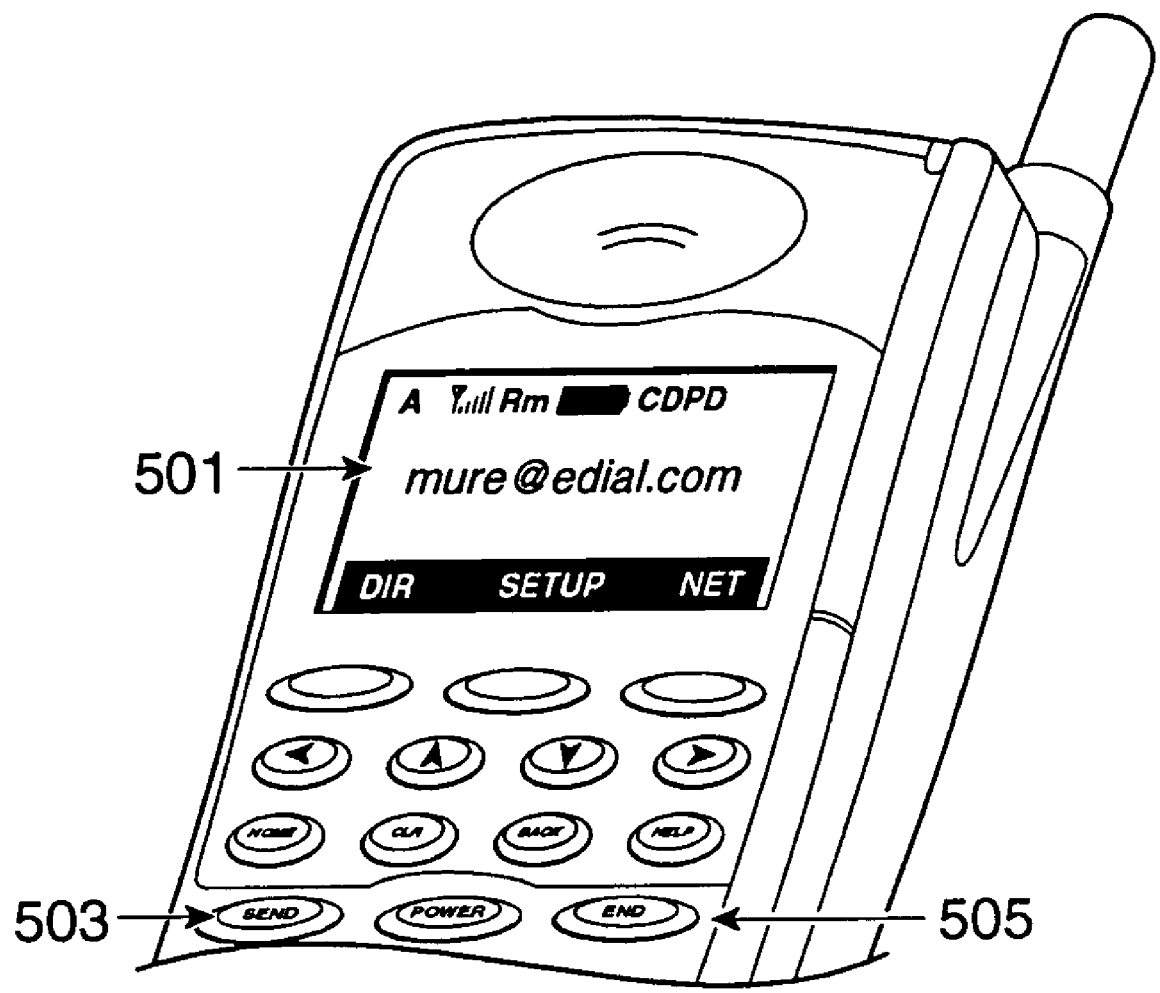
FIG. 5 is a partial perspective view of the modified cellular telephone of FIG. 4 following entry of an email address instead of a telephone number for purposes of placing a voice call.

Using a conventional keypad, prior to entering a non-numeric identifier where a numeric identifier would ordinarily be expected, the user is required to switch keypad modes. In the modified cellular phone of FIG. 4, therefore, in the PHONE READY condition, the center soft key within the row 405 is configured to change the keypad mode from numeric to alpha while still remaining in the PHONE operational mode. The user may then enter an identifier such as an email address 501 as shown in FIG. 5. When the identifier has been entered, the user presses the SEND key 503 in the usual manner, and later disconnects by pressing the END key 505, also in the usual manner.

In other embodiments of the invention, the cellular phone may be provided with a dedicated e-dial key. Pressing the key the first time prompts the user to enter an identifier. Pressing the key again causes the following series of steps to be performed.

Figure 13:
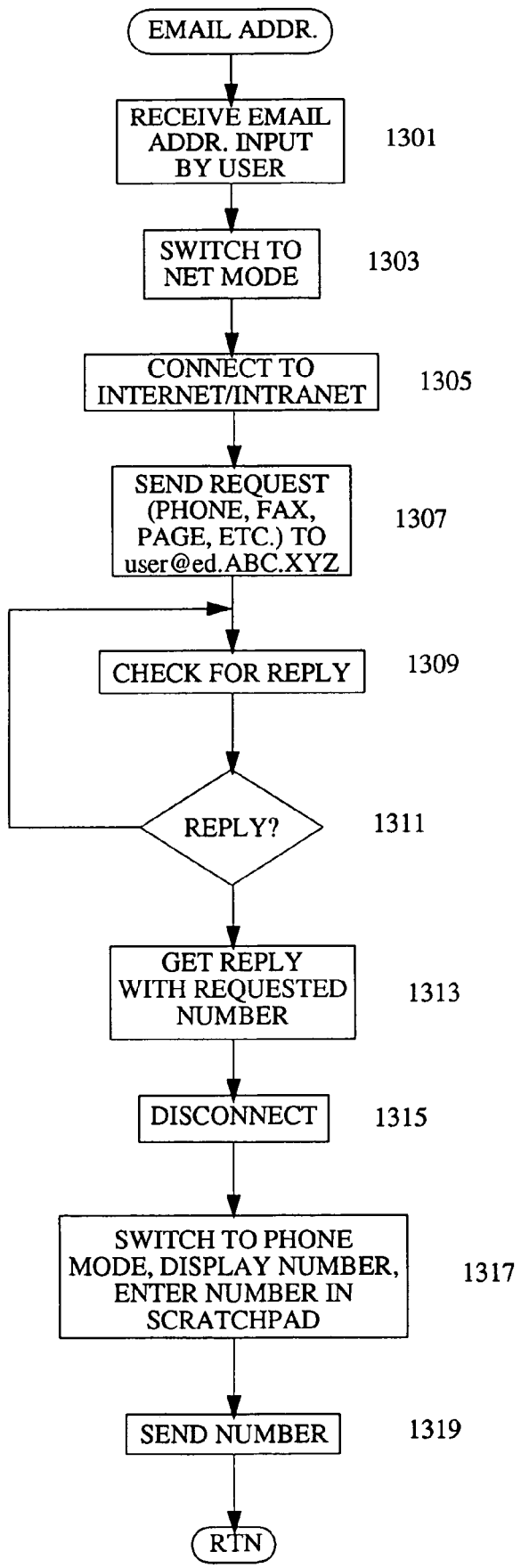

Subsequent to the user's pressing the SEND key (or other appropriate key), the cellular phone performs a series of steps as shown in FIG. 13. The cellular phone, having received the email address input by the user (1301), transparently switches to NET mode 1303), connects to the net (Internet, intranet, or extranet 1305) and sends an email request to an automailer at an email address that is a predictable variant of the entered email address (1307). The cellular phone then waits for a response from the automailer (polling loop 1309, 1311).

Figure 11:
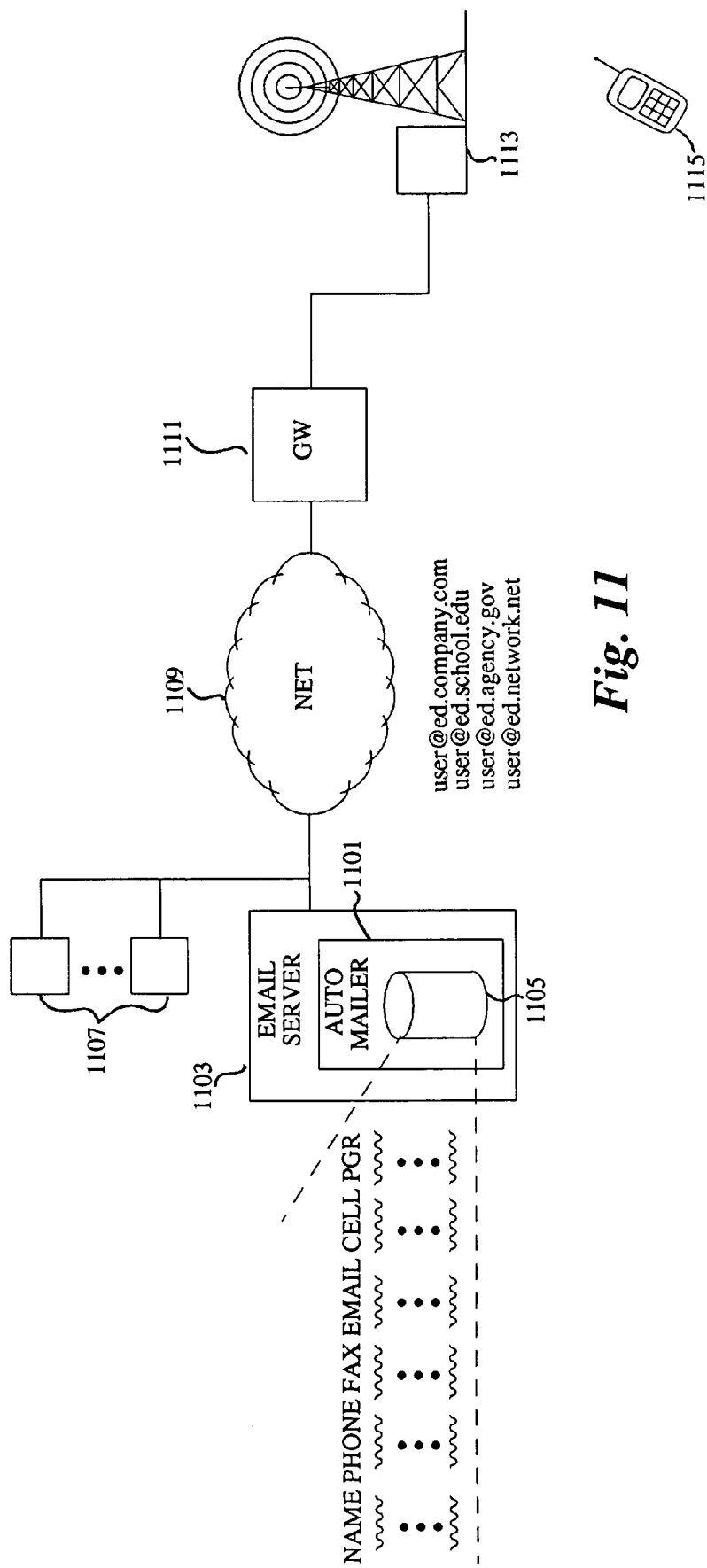
FIG. 11 is a block diagram illustrating an email server including an automailer that may be used to mail back a telephone number in response to an incoming mail message.

As shown in FIG. 11, the automailer 1101 is installed on an email server 1103. It handles mail addressed, for example, to user@ed.company.com, where ed stands for e-dial™ (or user@ed.school.edu, user@ed.agency.gov, user@ed.network.net, etc.). The automailer has access to a database 1105 containing a directory listing for each person within the directory various "comm" numbers, i.e., phone, fax, cellular phone, pager, etc. The email server 1103 (and possibly other servers 1107) are connected via the net 1109 to a communications gateway 1111. The communications gateway 1111 is coupled to a cellular base station 1113, which communicates with cellular phones including the cellular phone 1115.

Figure 3:
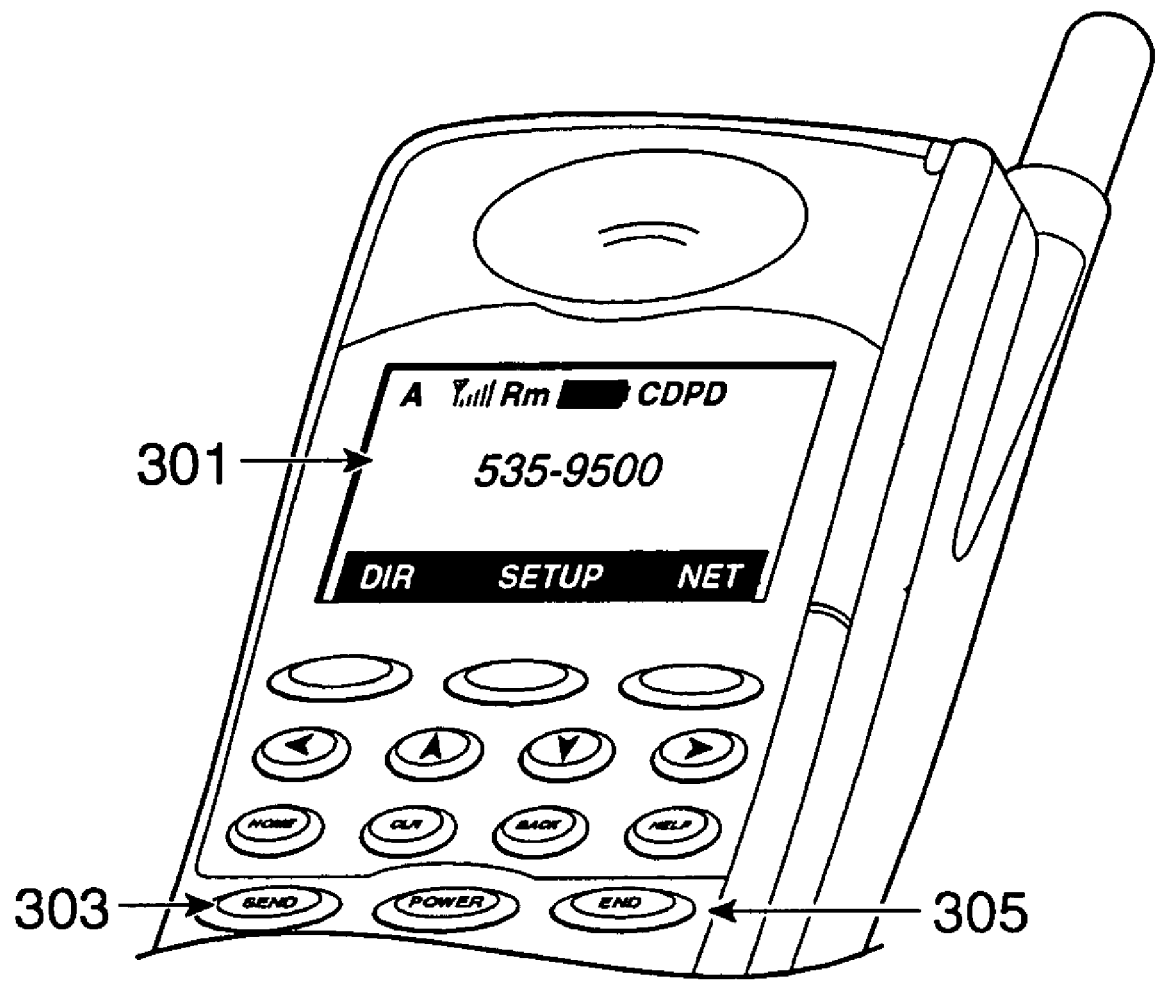
FIG. 3 is a partial perspective view of the cellular telephone of FIG. 2 following entry of a telephone number.

Referring again to FIG. 13, the automailer, when it receives the email from the cellular phone, looks up the requested number of the person to whom the email address belongs and immediately mails this number back to the cellular phone. (As described more fully in relation to FIG. 10 below, which of several possible numbers is desired may be clear from context or, if not clear from context, the user may be requested to specify in advance which number is desired.) The cellular phone gets the reply with the requested number (1313) and disconnects from the net 1315). In like manner as shown in FIG. 3, the phone then, still unbeknownst to the user, switches back to PHONE mode, displays the phone number and enters it in the phone's scratchpad (1317), and then sends the phone number (1319). Operation then proceeds as in the case of a conventional call. The user may save the retrieved phone number (saved in the scratchpad) in the phone directory, if desired.

The phone number may be included in the reply email message in any number of ways. For example, since neither the original email message nor the reply message is intended to be read, the subject header field may be used for messaging purposes. In the reply message, the desired phone number may therefore be placed in the subject field, for example. The remainder of the reply message may be ignored, and the reply message may be automatically deleted.

In accordance with a further feature of the present invention, the originating station may further include in the subject-field identifier the country code and area code of the user. The automailer may then compare the country code and area code to the country code and area code in its locale, or to the country code and area code of a number stored in the database. On this basis, the automailer is able to send the desired phone number with or without country code and with or without area code (even with or without out-dial code), depending on whether they are likely to be required by the user in order to establish a connection using the phone number.

In some instances, the number may not be available, i.e., it may not have been "self-listed" by the person or company. In such an instance, the call cannot be completed, and an advisory message is displayed. In one embodiment, the advisory message includes links to one or more centralized directory services, such as the Four-One-One Web page, etc. If desired, the user may then attempt to locate the desired number through these alternative means.

Figure 6:
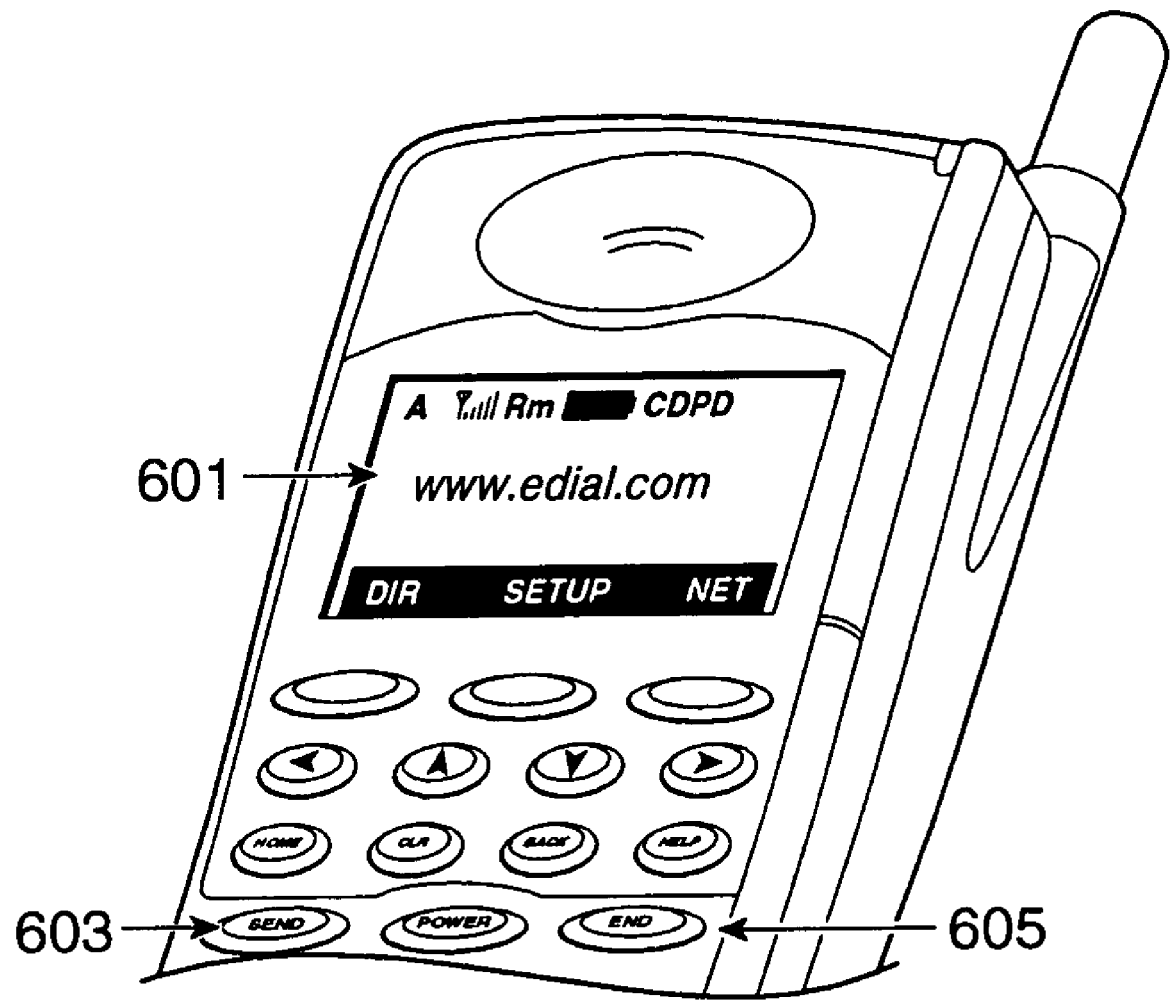
FIG. 6 is a partial perspective view of the modified cellular telephone of FIG. 4 following entry of a URL instead of a telephone number for purposes of placing a voice call.

The identifier, instead of an email address, may be a URL, for example, or other identifier. Whereas email addresses are person-specific, URLs are often company-specific. Hence, if a user wishes to contact an individual by phone, fax, or pager, for example, the user may enter the email address of that individual. If a user wishes to contact a company by phone, fax, etc., the user may enter a URL 601 of a company, as shown in FIG. 6.

Figure 14:
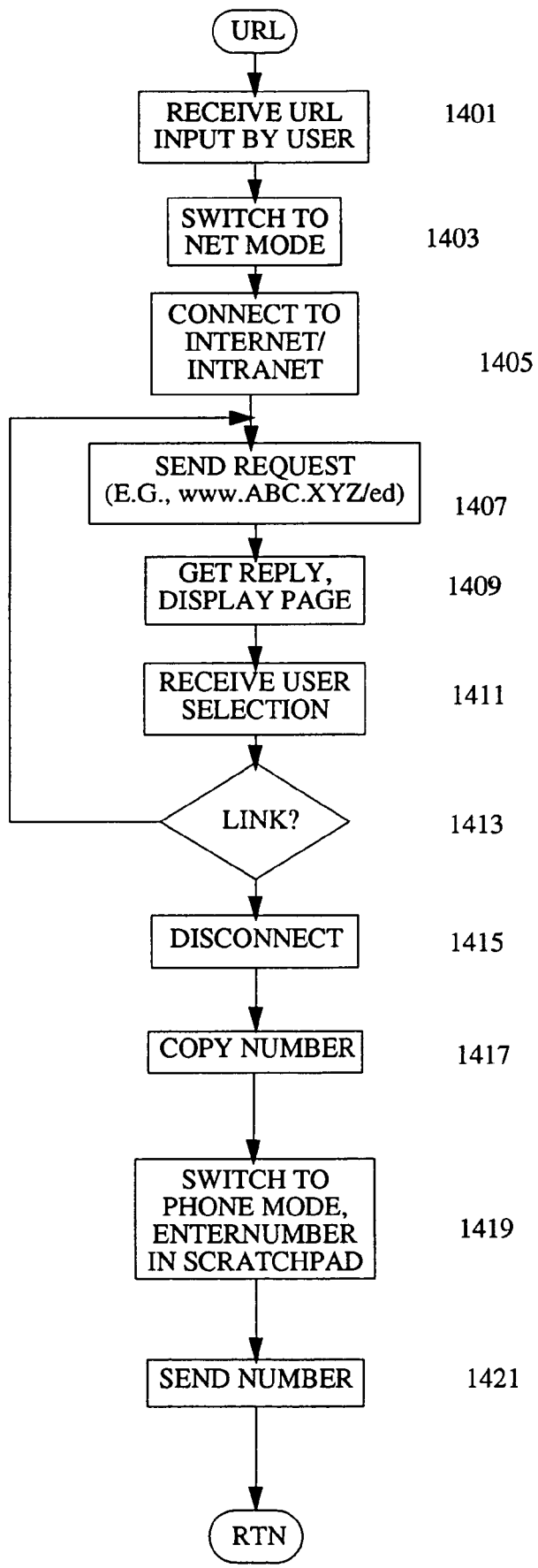

When the cellular phone is in PHONE mode and the user enters a URL and presses the SEND button 603, a similar sequence of operations occurs as previously described. Referring to FIG. 14, the cellular phone, having received the URL input by the user (1401), transparently switches to NET mode (1403), connects to the net (1405), sends an request to a server for a page the URL of which is a predictable variant of the entered URL (1407), and waits for a response from the server.

Figure 12:
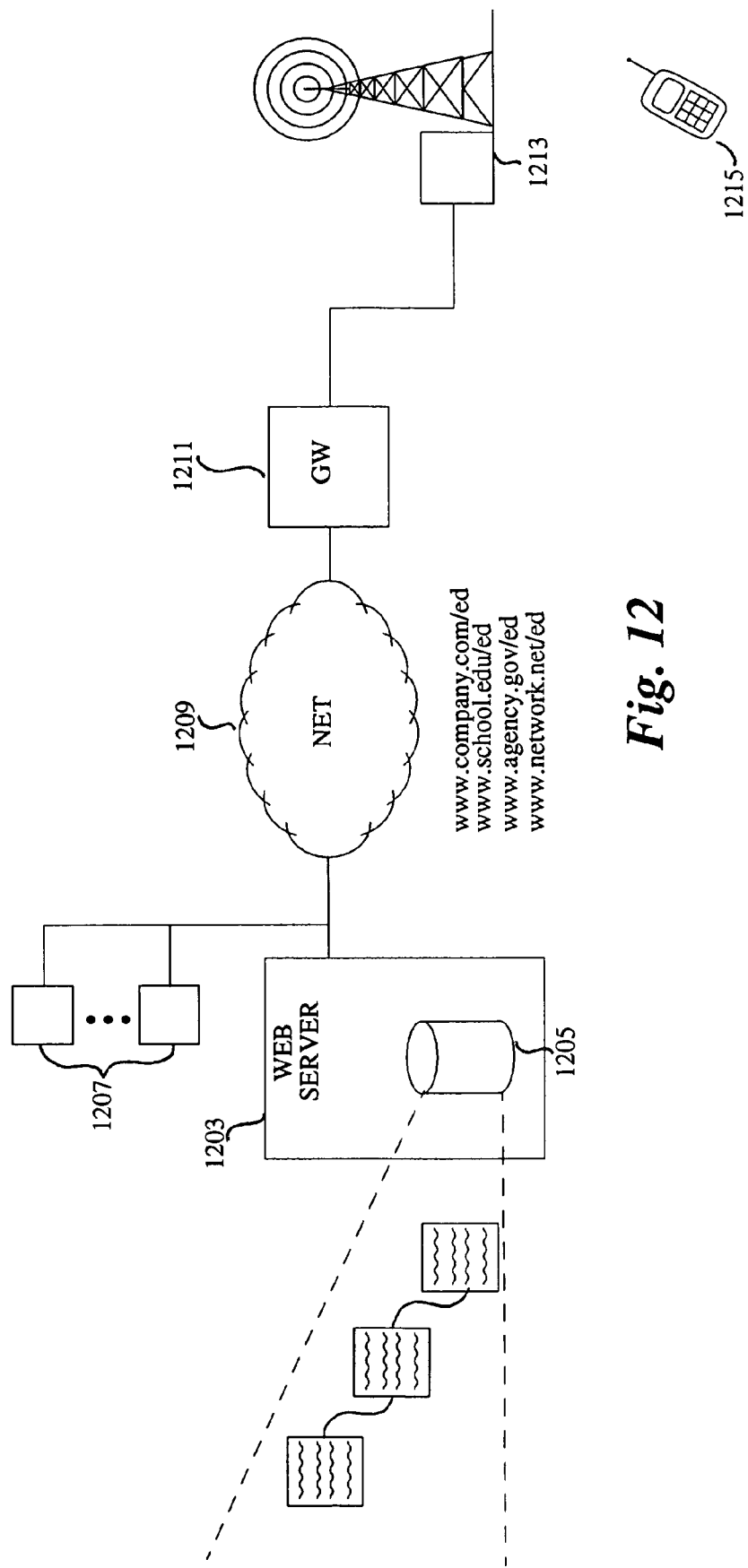
FIG. 12 is a block diagram illustrating a Web server on which a hierarchy of directory pages is stored.

As shown in FIG. 12, a Web server 1203 has access to storage 1205 containing a series of linked directory Web pages. One of the Web pages may have a URL such as www.company.com/ed (where ed stands for e-dial™). The Web server 1203 (and possibly other servers 1207) are connected via the net 1209 to a communications gateway 1211. The communications gateway 1211 is coupled to a cellular base station 1213, which communicates with cellular phones including the cellular phone 1215.

Referring again to FIG. 14, the server responds to the request in the usual manner by sending a page back to the cellular phone. The cellular phone displays the page (1409), an example of which is shown in FIG. 7. The page will be the first page in the hierarchy of directory pages, organized by function, for example. In the example of FIG. 7, the first page presents within a first column generic sub-divisions of a typical company (e.g, accounting, corporate, engineering, human resources, etc.). In the second column are presented corresponding telephone and fax numbers.

If the desired number is found at this general level, the user may cursor to the desired number to select it (1411) and press SEND. The phone then, still unbeknownst to the user, disconnects from the net (1415), copies the selected number (1417), switches back to PHONE mode (1419) and sends the phone number (1421). Operation then proceeds as in the case of a conventional call. The user may save the retrieved phone number in the phone directory, if desired.

If the user desires a more specific number, the user may cursor to any heading and press SEND. Each heading is a link that causes a more specific page relating to that heading to be retrieved and displayed. In the example of FIG. 7, the SALES/MARKETING heading has been selected, resulting in a more specific page being retrieved and displayed as shown in FIG. 8. Hence, as shown in FIG. 14, if the selection is a link (1413), another request is sent (1407), etc.

As with conventional Web browsers, there need be no limit to the number of levels of hierarchy. Assume that the user, presented with the page of FIG. 8, still has not found the desired number. The user might select still a further heading, resulting in the display of still a further page as shown in FIG. 9. As the depth within the hierarchy increases, the content of the page and resulting display may change, for example to display names of individuals at the leaf level of the hierarchy if the hierarchy is sufficiently detailed. If the number ultimately selected by the user is accompanied by a name, then preferably the name is displayed in addition to the selected number, to allow the user the opportunity of entering both the name and the number into the phone directory. (Of course, department names may also be displayed and entered into the phone directory if desired.)

Software for the e-dial service includes client software and server software. In one embodiment of the invention, support for the client software is provided within a standard protocol for wireless devices, such as the Wireless Application Protocol (WAP). The server software may be tailored for use by ISPs (Information Service Providers). An ISP may offer the e-dial service for free, as part of a premium service package, or on a per-use basis.

More preferably, a group of ISPs may jointly offer the e-dial service and coordinate billing. The benefit of the e-dial service is felt most keenly by the calling party. The benefits to the called party of being more easily reachable may be less apparent. If a per-use charge is to be levied, then most if not all of the charge should be made to the calling party, but the calling party is likely to not be a customer of the ISP and hence cannot be conveniently billed by the ISP. However, the calling party is likely to be a customer of a different ISP. If an agreement exists between the ISPs, then the calling party's ISP can charge and collect from the calling party and remit all or a portion of the charge to the called party's ISP for providing the underlying service. Settlement between the ISPs would occur based on a large number of aggregated transactions.

Preferably, each ISP subscriber is offered a Web-based interface to allow the subscriber to enter and update phone number information. For example, a subscriber may choose to make the subscriber's cellular phone number available in addition to the user's regular phone number. At some later date, the subscriber may decide that the number of cellular telephone calls being received exceeds the number that the subscriber wishes to receive. The subscriber would then log on to gain access to the subscriber's account and would delete the cellular telephone number.

The invention may also be used in conjunction with a deskset smartphone. In this instance, keypad limitations are removed, such that the object may be fulfilled of allowing an email address, URL or other identifier to be freely substituted for a phone number, a fax number, a pager number, etc., without requiring any additional steps on the part of a user.

Figure 10:
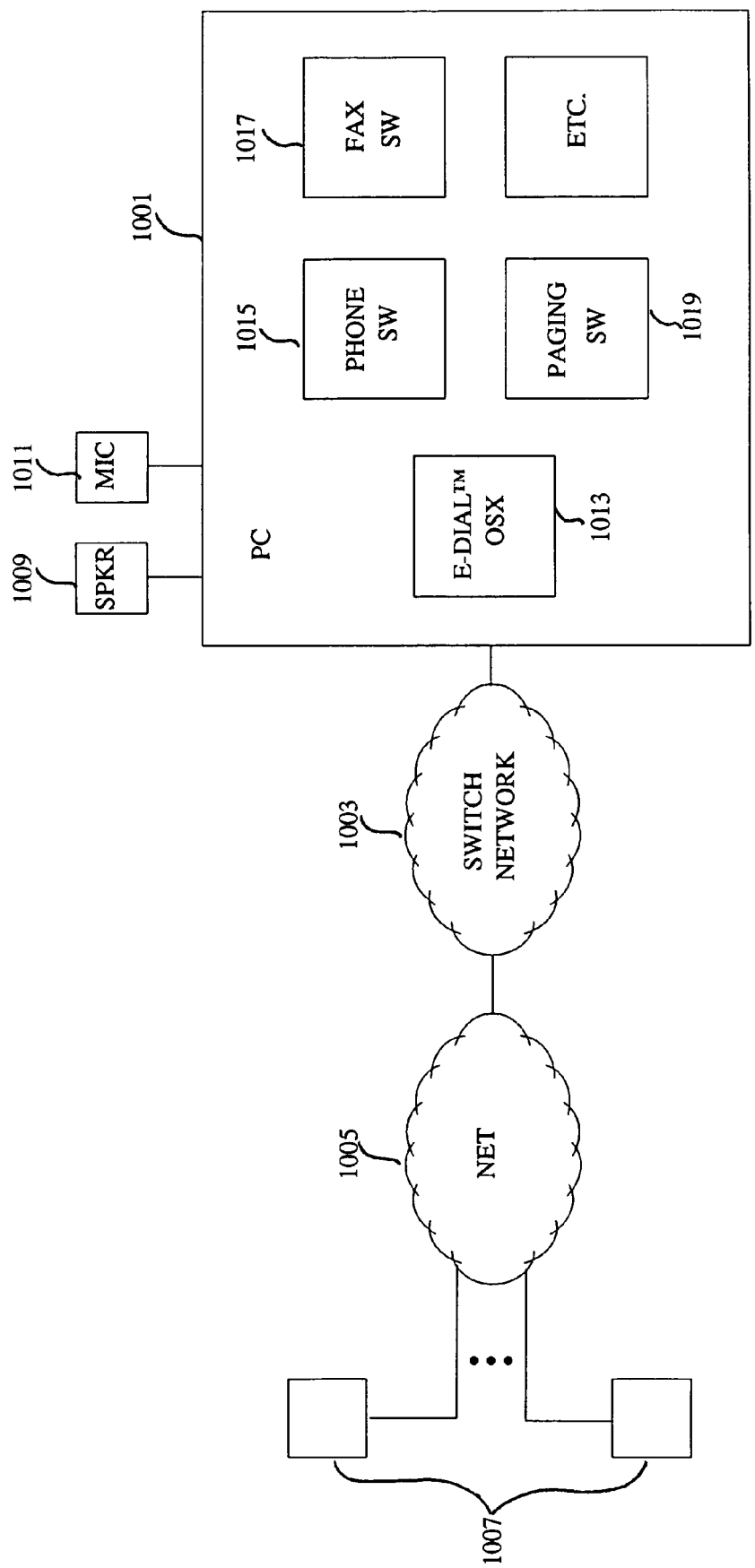
FIG. 10 is a block diagram illustrating a computer the operating system of which has a communications extension and which is loaded with various communications programs.

Similarly, the invention may be used in conjunction with a computer. Referring to FIG. 10, a computer 1001 is connected through a switched network 1003 (e.g., the Public Switched Telephone Network) to the net (1005). Connected to the net 1005 are various servers 1007. The computer 1001 is preferably a multimedia computer having at least one speaker 1009, a microphone 1011, a CD-ROM or DVD drive (not shown), etc.

Installed on the computer 1001 is software including an e-dial™ Operating System Extension (OSX) 1013 and various e-dial enabled communications packages, including, for example, phone software 1015, fax software 1017, paging software 1019, etc.

Figure 15:
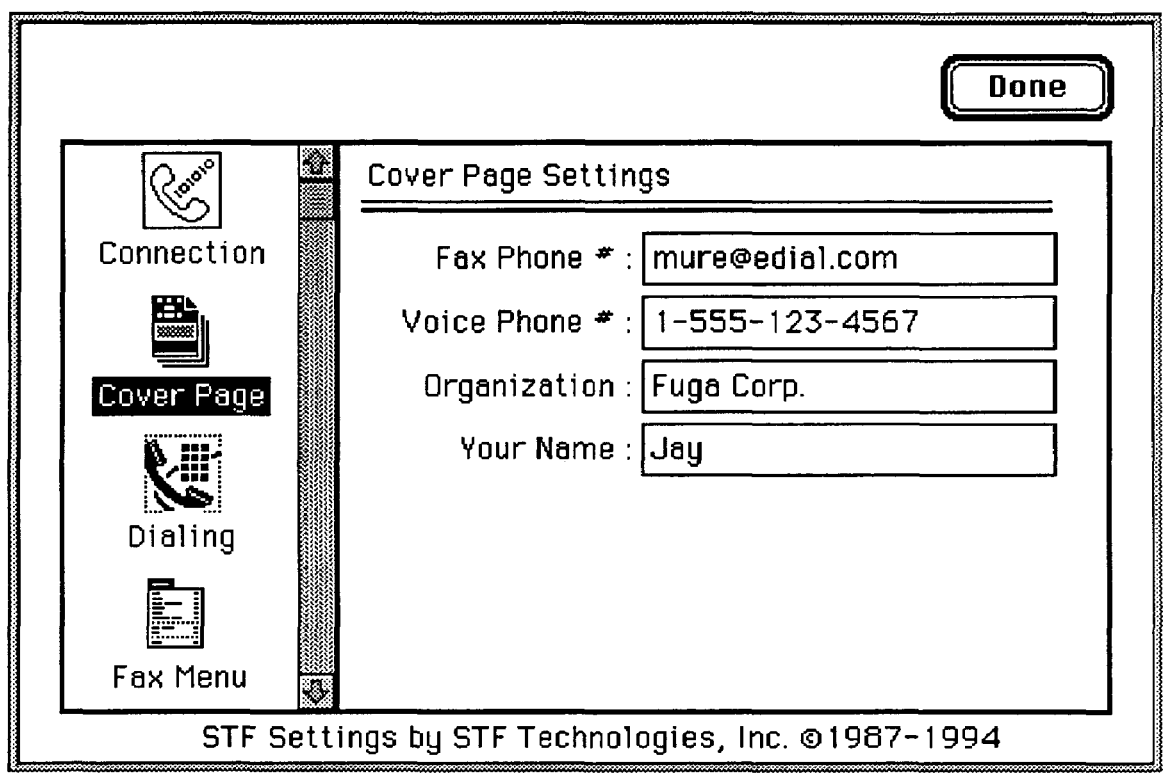
FIG. 15 is a screen display displayed during operation of a computer in accordance with one embodiment of the present invention.

When a "comm" number is to be input to an e-dial-enabled comm application, the application makes a call to the e-dial OSX. The call includes sufficient information to allow the operating system to display an identifier entered by the user within the appropriate field on the display screen. An e-dial icon may be displayed alternately with the icon of the comm application on screen within an application bar area, as shown in FIG. 15. The e-dial OSX then proceeds to receive the user-input identifier and display it in the appropriate field. The identifier may have a length exceeding the length of the field, in which case a known scrolling behavior within the field is exhibited.

As the identifier is being input, the OSX checks the identifier to determine whether it is strictly a numeric identifier or whether it is primarily an alpha identifier, looking particularly for the substring "www", the "@" character, etc. When the OSX receives a terminating character, if the identifier has been determined to be strictly numeric, the OSX returns the identifier to the comm application, operation of which proceeds as normal.

If the identifier has been determined to be an email address used in a non-email context, for example, the OSX, without substantially altering a majority of the display area, opens an email component in order to perform the operations depicted in FIG. 13. During lookup of the desired phone number, the entered identifier may be flashed on the screen to signal the user that lookup is proceeding.

If the desired phone number is obtained, it is returned to the comm application, which inserts it in the appropriate field and proceeds with operation as normal. If the desired phone number is not obtained, then the OSX blanks the field and shows an alert, informing the user that the number could not be obtained.

Phone numbers may be cached locally on the computer in correspondence to the alphanumeric strings by which they were retrieved. A cache of phone numbers may be built up and maintained using an LRU (Least Recently Used) or other suitable strategy. In this manner, alphanumeric strings may be used to call frequently-called parties without incurring the lookup overhead previously described.

If the identifier is determined to be a URL or the like (entered in a non-Web context), then operation proceeds as shown in FIG. 14. Assuming that a first directory screen is obtained, a window is opened and the directory screen is displayed. If the user selects a phone number, then the window that was opened is closed, and that number is inserted into the appropriate field within the display screen of the comm application. The OSX then returns control to the comm application.

If the user selects an item other then a phone number, then a link is followed to retrieve and display a next directory screen, if any. Preferably, a BACK button is also provided to allow the user to traverse the directory structure in a familiar manner. If the desired phone number is not found, the user selects a close button to cause the window to be closed. The field within the comm application then remains blank. The user may then resort to alternative means to try to find the desired phone number.

If the desired phone number is not found, it may be because e-dial is not supported at the site in question or because, although e-dial is supported at the site, either the information at the site is not current or the information of the user in expecting the number to be at the site is not current.

If e-dial is not supported at the site, an email notification may be sent, e.g, to "postmaster" or "webmaster", that an attempt was made to use e-dial to contact someone at the site, together with information as to where e-dial software may be obtained. If e-dial is supported at the site, an email notification may be sent to the automailer. In response to the notification, the automailer may send an email form to the person whose number was not found, such that by completing and returning the form that person may then be listed.

The invention, in somewhat modified form, may also be used with a two-way pager. The use of an email address to facilitate establishment of a circuit-switched call will be described, although a URL or other identifier could likewise be used.

Known two-way pagers are capable of sending both pages and email. Insofar as these two modes of communication are concerned, the invention may be used without modification. Two-way pagers, however, are not presently capable of telephonic communications. Nevertheless, with appropriate modifications, a two-way pager may be used to readily obtain a desired telephone number that may then be dialed from a cellular or conventional telephone.

For example, the two-way pager may be provided with a special-purpose button, hard or soft (referred to herein as an "e-dial" button) which when pressed, readies the two-way pager to have input an email address. To facilitate entry of such addresses, preferably the two-way pager is provided with an input device such as that described in the aforementioned PCT application or with other suitable input means, such as the T9™ input system of Tegic Communications, Inc. of Seattle, Wash.

When the user has finished inputting the email address, the e-dial button is again pressed. The two-way pager then functions in a similar manner as in the embodiments previously described, to send an email message and receive an email reply, and to automatically extract from that email reply the desired phone number.

Because the two-way pager (presumably) lacks telephonic communications, it cannot use the phone number to establish a circuit-switched connection. Instead, the two-way pager displays the phone number to the user. The number may be stored in a directory of the pager if desired. The pager may also be equipped with autodial capabilities such that the user may hold the pager next to the microphone of a landline telephone and again press the e-dial button to cause the pager to produce appropriate tones in order to dial the number.

Note that, with advances in IP telephony, the call that is setup needn't be a circuit-switched call but may just as easily be a packet-switched voice call set up using a conventional phone number.

The same technique as described may be used not only to transparently look up communications identifiers but also to look up other information, for example an entity's public key for use in public key cryptography. One of the impediments to the widespread use of public key cryptography has been the disemination of public keys.

In accordance with a further aspect of the invention, encryption keys (e.g., public keys) are self-listed. An electronic communications program that is e-dial enabled is provided with an encryption option. If the encryption option is selected then, prior to sending the electronic message, the program establishes a connection to an e-dial enabled server identified by a send-to address of the message and receives an encryption key for the intended recipient. The electronic communication is then encrypted in accordance with the encryption key. If the electronic message designates multiple recipients, the same process may be followed for each recipient.

Note that the content of the encrypted communication may be arbitrary digital content—text, graphics, pictures, video, live voice, recorded voice, etc.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of retrieving desired phone number information using an Internet protocol, comprising the steps of:
   receiving, via user input entered to an electronic device, an internet address of a party whose phone number information is to be retrieved;
   sending a request from the electronic device to at least one of an email server and a web server in accordance with the Internet protocol, the request containing a predictable variant of said address; and
   in response to the request, receiving from at least one of the email and the web server sending the desired phone number information.

2. The method of claim 1, wherein the desired phone number information comprises a single phone number, comprising the further step of the electronic device automatically dialing the single phone number.

3. The method of claim 1, wherein the desired phone number information comprises a hypertext phone directory page, comprising the further step of the electronic device displaying the hypertext phone directory page.

4. The method of claim 3, comprising the further steps of:
   in response to the user selecting a link within the hypertext phone directory page,
   the electronic device cooperating with the server to retrieve and display a further hypertext phone directory page.

5. The method of claim 3, comprising the further steps of:
   in response to the user selecting a single phone number within the hypertext phone directory page; and
   the electronic device automatically dialing the selected phone number.

6. A method of establishing a desired telecommunications connection, comprising the steps of:
   receiving a character string entered by a user;
   determining whether or not the character string comprises a telephone number;
   if the character string comprises an Internet address,
     establishing a preliminary telecommunications connection;
     using the character string during the course of the preliminary telecommunications connection to establish the desired telecommunications connection:
     receiving the telephone number from the desired telecommunications connection:
     setting the telephone number as the character string; and
   if the character string comprises a telephone number, establishing the desired telecommunications connection directly using the telephone number.

7. The method of claim 6, wherein the character string is a an email address and the preliminary telecommunications connection is established with an email server in accordance with an email protocol.

8. The method of claim 6, wherein the string is a resource locator and the preliminary telecommunications connection is established with a hyper-media server in accordance with a hyper-media protocol.

9. An electronic system comprising:
   a data processing core, including memory;
   coupled to the data processing core:
     a modem;
     a circuit-switched telecommunications transceiver;
     a packet-switched telecommunications transceiver; and
     I/O circuitry;
   the combination further comprising stored program instructions within memory including instructions for:
     receiving a character string entered by a user;
     if the character string comprises an internet address,
       establishing a preliminary telecommunications connection using the character string;
       receiving the telephone number during the course of the preliminary telecommunications connection;
       setting the telephone number as the character string; and
       at least one of displaying the telephone number and using the telephone number to establish the desired telecommunications connection: and
     if the character string comprises a telephone number, establishing a desired telecommunications connection directly using the telephone number.

10. The apparatus of claim 9, wherein the electronic system is a smart cellular telephone.

11. The apparatus of claim 9, wherein the electronic system is a personal computer configured to be coupled to the public switched telephone network.

12. The apparatus of claim 9, wherein the electronic system is a smart deskset telephone configured to be coupled to the public switched telephone network.

13. An electronic system for use in establishing a desired telecommunications connection, comprising:
- a data processing core, including memory;
- coupled to the data processing core:
  - a packet-switched telecommunications transceiver; and
  - I/O circuitry;
- the combination further comprising stored program instructions within memory including instructions for:
- receiving an Internet address of a desired party entered by a user;
- sending a request to at least one of the email server and a web server in accordance with an Internet protocol, the request containing a predictable variant of said Internet address; and
- receiving from at least one of the email server and the web server a communication string of the desired party.

14. A method of establishing communication with a party using an electronic device, comprising:
- transparently prefacing the communication with a network communications exchange, established based on an Internet address of the party with which communication is to be established, to obtain information for communicating with said party;
- sending a request to at least one of an email server and a web server in accordance with an Internet protocol, the request containing a predictable variant of said Internet address: and
- connecting the electronic device for communication with said party using said information.

15. The method of claim 14, wherein the information is a telephone number.

16. The method of claim 14, wherein the information is a cryptographic key.

17. The method of claim 14, comprising enabling a user to input the electronic address of the party with which communication is to be established.

18. The method of claim 7, wherein the e-mail protocol is a Simple Mail Transfer Protocol.

19. The method of claim 8, wherein the hyper-media protocol is a Hyper-Text Transfer Protocol.

20. The method of claim 6, wherein the character string is at least one of an email address and a URL.

* * * * *

UNITED STATES PATENT AND TRADEMARK OFFICE
CERTIFICATE OF CORRECTION

| | | |
|---|---|---|
| PATENT NO. | : 7,382,871 B1 | |
| APPLICATION NO. | : 09/332545 | |
| DATED | : June 3, 2008 | |
| INVENTOR(S) | : Michael J. Ure | |

It is certified that error appears in the above-identified patent and that said Letters Patent is hereby corrected as shown below:

On the face of the patent:

Please add the related U.S. Application Data as follows:

-- Related U.S. Application Data

(63)   Continuation of application No. PCT/US98/01419, filed January 26, 1998;

(60)   Provisional application No. 60/036,047, filed January 27, 1997. --

In the Specification:

At column 1, lines 5-9, please amend the paragraph as follows:

This application claims priority under 35 USC 120 as a continuation of PCT/US98/01419 filed Jan. 26, 1998, designating the U.S., which is incorporated hereby by reference, which in turns turn claims priority of U.S. Provisional Application 60/036,047 filed Jan. 27, 1997.

Signed and Sealed this
Sixth Day of September, 2011

David J. Kappos
*Director of the United States Patent and Trademark Office*